D. M. SMITH.
METHOD OF MAKING SWINGLETREES OR DRAFT MEMBERS.
APPLICATION FILED FEB. 12, 1912.

1,049,160. Patented Dec. 31, 1912.

WITNESSES
R H Balderson
W Tamarisy

INVENTOR
D. M. Smith,
by Bakewell, Byrnes & Parmelee,
attys.

UNITED STATES PATENT OFFICE.

DAVID M. SMITH, OF SEWICKLEY, PENNSYLVANIA, ASSIGNOR TO DIAMOND FORGING & MANUFACTURING COMPANY, OF PITTSBURGH, PENNSYLVANIA, A CORPORATION OF PENNSYLVANIA.

METHOD OF MAKING SWINGLETREES OR DRAFT MEMBERS.

1,049,160. Specification of Letters Patent. Patented Dec. 31, 1912.

Application filed February 12, 1912. Serial No. 677,084.

*To all whom it may concern:*

Be it known that I, DAVID M. SMITH, of Sewickley, Allegheny county, Pennsylvania, have invented a new and useful Improvement in Methods of Making Swingletrees or Draft Members, of which the following is a full, clear, and exact description, reference being had to the accompanying drawings, forming part of this specification, in which—

Figure 1:
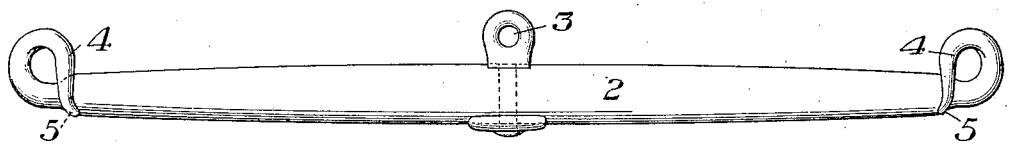
Figure 2:
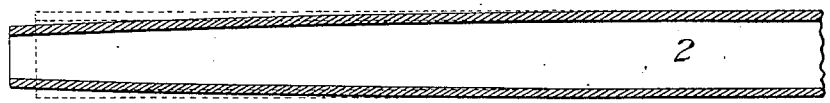
Figure 3:
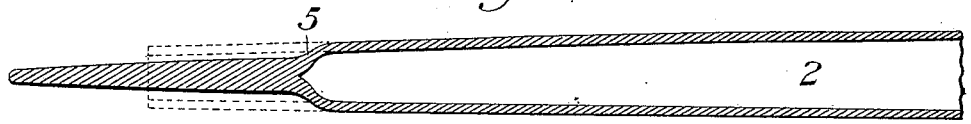
Figure 4:
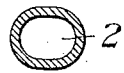

Figure 1 is a plan view of one form of my improved draft member; Fig. 2 is a sectional view of one portion of the draft member showing the first step in the method of making the same; Fig. 3 is a similar view in which I have shown the next step in the method of making the same; and Fig. 4 is a transverse section of Fig. 1.

My invention relates to swingletrees or draft members, and the method of making the same.

The object of my invention is to produce a cheap and efficient device in which the hook members or connecting devices at the ends thereof are formed integrally with the tubular body of a metallic draft member. The precise nature of my invention will be best understood by reference to the accompanying drawings, which will now be described, it being premised, however, that various changes may be made in the details of construction and the method of making the same, without departing from the spirit and scope of my invention as defined in the appended claims.

In the drawings, the numeral 2 designates a tubular draft member, having connected to the central portion thereof an eye 3 for connecting the draft member to the object to which power is to be applied, and which may be connected to the draft member in any desired manner.

Formed integrally with the draft member and at the ends thereof are the hooks 4 which are bent upon themselves to retain the rings on the draft chains in position within the hooks.

In producing this article, I first take a piece of tubing and swage the ends to taper the same in the manner shown in Fig. 2. I then further swage the extreme end portion thereof to form a solid extension on the ends of the member 2, as clearly shown in Fig. 2. I then taper the outer ends of these projections, and bend them upon themselves to form hooks as shown at 4 in Fig. 1. The closing up of the tubes at its ends to form the solid extensions forms abrupt offsets at 5, which serve as stops for the rings on the traces or draft chains which are connected to the hooks 4.

The advantages of my invention result from the provision of a swingletree or draft member formed from a piece of tubing, and in which solid hooks are formed integrally on the ends of said draft members.

I claim:—

1. The method of making metallic tubular draft members, consisting in tapering the end of a tubular blank, then swaging down the tapered portion into a solid extension, and bending said extension into hook form, substantially as described.

2. The method of making metallic tubular draft members, consisting in tapering the end of a tubular blank, then swaging down the tapered portion into a solid extension, with an abrupt shoulder between it and the draft member, and bending said extension into hook form, substantially as described.

In testimony whereof, I have hereunto set my hand.

D. M. SMITH.

Witnesses:
JESSE B. HELLER,
H. M. CORWIN.

---

Copies of this patent may be obtained for five cents each, by addressing the "Commissioner of Patents, Washington, D. C."